(12) United States Patent
Zhang

(10) Patent No.: US 11,526,545 B2
(45) Date of Patent: Dec. 13, 2022

(54) METHOD OF PROCESSING COVER PAGE IMAGE OF MULTIMEDIA INFORMATION, CLIENT AND ELECTRONIC DEVICE

(71) Applicant: Beijing Baidu Netcom Science and Technology Co., Ltd., Beijing (CN)

(72) Inventor: Jifeng Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/278,603

(22) PCT Filed: Aug. 14, 2020

(86) PCT No.: PCT/CN2020/109227
§ 371 (c)(1),
(2) Date: Mar. 22, 2021

(87) PCT Pub. No.: WO2021/159679
PCT Pub. Date: Aug. 19, 2021

(65) Prior Publication Data
US 2021/0279267 A1    Sep. 9, 2021

(30) Foreign Application Priority Data

Feb. 10, 2020    (CN) .......................... 202010087695.7

(51) Int. Cl.
*G06F 16/438*    (2019.01)
*G06F 16/44*    (2019.01)
(Continued)

(52) U.S. Cl.
CPC .......... *G06F 16/438* (2019.01); *G06F 16/434* (2019.01); *G06F 16/44* (2019.01); *G06T 3/4053* (2013.01)

(58) Field of Classification Search
CPC ...... G06F 16/438; G06F 16/434; G06F 16/44; G06T 3/4053
(Continued)

(56) References Cited

U.S. PATENT DOCUMENTS 9,386,328 B1 * 7/2016 Crane ................ H04N 21/2387
9,691,133 B1 * 6/2017 Liu ............................ G06T 5/50
(Continued)

FOREIGN PATENT DOCUMENTS

CN    106572381 A    4/2017
CN    107155110 A    9/2017
(Continued)

OTHER PUBLICATIONS

Xiong et al. "Super Resolution for Low Quality Thumbnail Images." IEEE, pp. 181-184. https://www.microsoft.com/en-us/research/wp-content/uploads/2016/12/super_icme_08.pdf (Year: 2008).*
(Continued)

*Primary Examiner* — Kimberly L Wilson
(74) *Attorney, Agent, or Firm* — Quinn IP Law

(57) ABSTRACT

A method of processing a cover page image of multimedia information, a client and an electronic device are provided. The method includes acquiring initial cover page images of N pieces of second multimedia information following first multimedia information, where the first multimedia information is displayed on a current display interface of the client, the N pieces of second multimedia information are not displayed on the current display interface of the client, and N is an integer greater than or equal to 1, performing a super-resolution processing on the initial cover page images of the N pieces of second multimedia information, to obtain super-resolution cover page images of the N pieces of second multimedia information, and displaying the super-resolution cover page images of the second multimedia
(Continued)

information, in a case that the second multimedia information enters the current display interface.

10 Claims, 2 Drawing Sheets

(51) Int. Cl.
  *G06F 16/432* (2019.01)
  *G06T 3/40* (2006.01)
(58) Field of Classification Search
  USPC .......................................................... 707/722
  See application file for complete search history.

(56) References Cited

U.S. PATENT DOCUMENTS

| | | | | |
|---|---|---|---|---|
| 10,452,920 | B2* | 10/2019 | Kauffmann | H04N 5/2628 |
| 10,694,071 | B2* | 6/2020 | Matejka | G11B 27/102 |
| 2010/0026737 | A1* | 2/2010 | Ida | G09G 5/391 |
| | | | | 345/698 |
| 2015/0310798 | A1* | 10/2015 | Heide | G09G 3/36 |
| | | | | 345/55 |
| 2016/0371818 | A1* | 12/2016 | Su | G06T 3/4007 |
| 2017/0109012 | A1 | 4/2017 | Chen | |
| 2017/0123982 | A1* | 5/2017 | Haven | H04L 67/5682 |
| 2018/0336226 | A1* | 11/2018 | Anorga | G06N 20/00 |
| 2019/0378242 | A1 | 12/2019 | Zheng et al. | |

FOREIGN PATENT DOCUMENTS

| | | |
|---|---|---|
| CN | 108765281 A | 11/2018 |
| CN | 109360153 A | 2/2019 |
| CN | 109410141 A | 3/2019 |
| CN | 109801221 A | 5/2019 |
| JP | 2003058867 A | 2/2003 |

OTHER PUBLICATIONS

Written Opinion of the International Searching Authority for International application No. PCT/CN2020/109227, dated Nov. 17, 2020.

Japanese Office Action for Japanese Patent Application No. JP2021-514505, dated May 16, 2022.

* cited by examiner

METHOD OF PROCESSING COVER PAGE IMAGE OF MULTIMEDIA INFORMATION, CLIENT AND ELECTRONIC DEVICE

CROSS REFERENCE OF RELATED APPLICATION

This application is the U.S. national phase of PCT Application PCT/CN2020/109227 filed on Aug. 14, 2020, which claims a priority to Chinese Patent Application No. 202010087695.7 filed on Feb. 10, 2020, the disclosures of which are incorporated in their entirety by reference herein.

TECHNICAL FIELD

The present disclosure relates to computer technologies, in particular, to the field of image processing technologies, and in particular to a method of processing a cover page image of multimedia information, a client and an electronic device.

BACKGROUND

A user can browse multimedia information through a client, most of the multimedia information is provided with a cover page image for previewing, and a super-resolution processing may be performed on the cover page image of the multimedia information in order to improve the previewing effect of the multimedia information. The super-resolution processing method for the cover page image of the multimedia information in the related art includes: when the client requests the cover page image of the multimedia information, the server performs a super-resolution processing on the cover page image of the multimedia information and returns the processed cover page image to the client. However, this method requires a long time, and when the user previews the multimedia information quickly, the user may not have enough time to browse the super-resolution cover page image, which results in a poor preview effect of the multimedia information.

SUMMARY

A method of processing a cover page image of multimedia information, a client and an electronic device are provided in the present disclosure.

In a first aspect, a method of processing a cover page image of multimedia information is provided in the present disclosure, applied to a client and includes:

acquiring initial cover page images of N pieces of second multimedia information following first multimedia information, where the first multimedia information is displayed on a current display interface of the client, the N pieces of second multimedia information are not displayed on the current display interface of the client, and N is an integer greater than or equal to 1;

performing a super-resolution processing on the initial cover page images of the N pieces of second multimedia information, to obtain super-resolution cover page images of the N pieces of second multimedia information; and displaying the super-resolution cover page images of the second multimedia information, in a case that the second multimedia information enters the current display interface.

According to the method above, the user may browse the super-resolution cover page image in time when previewing the multimedia information, and the previewing effect of the multimedia information is improved.

Optionally, the acquiring the initial cover page images of the N pieces of second multimedia information following the first multimedia information includes:

acquiring the initial cover page images of the N pieces of second multimedia information following the first multimedia information, according to a quantity of multimedia information capable of being displayed by a single display interface of the client, where N is greater than or equal to the quantity of multimedia information.

According to the embodiment above, the client acquires the initial cover page images of a plurality of pieces of multimedia information at a single time, which can improve the super-resolution processing efficiency of the client compared with the case where an initial cover page image of a single piece of multimedia information is acquired at a single time.

Optionally, the performing the super-resolution processing on the initial cover page images of the N pieces of second multimedia information to obtain the super-resolution cover page images of the N pieces of second multimedia information includes:

dividing the initial cover page images of the N pieces of second multimedia information into M processing groups, according to image parameters of the initial cover page images of the N pieces of second multimedia information, where each processing group includes at least one initial cover page image of the second multimedia information, and M is an integer greater than or equal to 1;

inputting the M processing groups into M image super-resolution processing models respectively to perform the super-resolution processing on the M processing groups, to obtain the super-resolution cover page images of the N pieces of second multimedia information.

According to the embodiment above, on one hand, by dividing the initial cover page images of the plurality of multimedia information into a plurality of processing groups, a parallel processing may be realized, so that the image processing speed may be increased, and the image processing efficiency may be improved; on the other hand, a plurality of image super-resolution processing models suitable for different image parameters may be set in the client, so that the initial cover page image of the multimedia information may be input into the appropriate image super-resolution processing model according to the image parameters, and the image processing efficiency and effect may be further improved.

Optionally, the displaying the super-resolution cover page images of the second multimedia information in the case that the second multimedia information enters the current display interface includes:

displaying the super-resolution cover page images of the second multimedia information, in a case that the second multimedia information enters the current display interface and a moving speed of the second multimedia information on the current display interface is less than or equal to a preset speed.

According to the embodiment above, whether the super-resolution cover page image of the multimedia information is displayed or not is determined according to the moving speed of the multimedia information on the current display interface, the super-resolution cover page image of the multimedia information is displayed when the super-resolution cover page image needs to be displayed, and the super-resolution cover page image of the multimedia information is not displayed when the super-resolution cover page image does not need to be displayed, so that the resource consumption required by the display of the super-resolution cover page image may be effectively reduced.

Optionally, the displaying the super-resolution cover page images of the second multimedia information in the case that the second multimedia information enters the current display interface includes:

replacing the initial cover page images of the second multimedia information with the super-resolution cover page images of the second multimedia information, in the case that the second multimedia information enters the current display interface; and displaying the super-resolution cover page images of the second multimedia information.

According to the embodiment above, when the multimedia information enters the current display interface, the initial cover page image of the multimedia information is replaced by the super-resolution cover page image in real time, so that the resource consumption of the multimedia information may be reduced, and the loading time of the multimedia information may be shortened.

Optionally, the method further includes:

replacing the super-resolution cover page images of the second multimedia information with the initial cover page images of the second multimedia information, in a case that the second multimedia information exits the current display interface of the client.

According to the embodiment above, when the multimedia information exits the current display interface, the super-partition cover page image of the multimedia information is replaced by the initial cover page image thereof, so that the resource consumption of the multimedia information may be reduced.

In a second aspect, a client is provided in the present disclosure, including:

an acquiring module, configured to acquire initial cover page images of N pieces of second multimedia information following first multimedia information, where the first multimedia information is displayed on a current display interface of the client, the N pieces of second multimedia information are not displayed on the current display interface of the client, and N is an integer greater than or equal to 1;

a processing module, configured to perform a super-resolution processing on the initial cover page images of the N pieces of second multimedia information, to obtain super-resolution cover page images of the N pieces of second multimedia information; and a displaying module, configured to display the super-resolution cover page images of the second multimedia information in a case that the second multimedia information enters the current display interface.

Optionally, the acquiring module is further configured to:

acquire the initial cover page images of the N pieces of second multimedia information following the first multimedia information, according to a quantity of multimedia information capable of being displayed by a single display interface of the client, where N is greater than or equal to the quantity of multimedia information.

Optionally, the processing module includes:

a grouping submodule, configured to divide the initial cover page images of the N pieces of second multimedia information into M processing groups according to image parameters of the initial cover page images of the N pieces of second multimedia information, where each processing group includes at least one initial cover page image of the second multimedia information, and M is an integer greater than or equal to 1;

a processing submodule, configured to input the M processing groups into M image super-resolution processing models respectively to perform the super-resolution processing on the M processing groups, to obtain the super-resolution cover page images of the N pieces of second multimedia information.

Optionally, displaying module is further configured to:

display the super-resolution cover page images of the second multimedia information, in a case that the second multimedia information enters the current display interface and a moving speed of the second multimedia information on the current display interface is less than or equal to a preset speed.

Optionally, the displaying module includes:

a replacing sub-module, configured to replace the initial cover page images of the second multimedia information with the super-resolution cover page images of the second multimedia information in the case that the second multimedia information enters the current display interface; and a displaying sub-module, configured to display the super-resolution cover page images of the second multimedia information.

Optionally, the client further includes:

a replacing module, configured to replace the super-resolution cover page images of the second multimedia information with the initial cover page images of the second multimedia information in a case that the second multimedia information exits the current display interface of the client.

In a third aspect, an electronic device is provide in the present disclosure, comprising:

at least one processor; and a memory communicatively coupled to the at least one processor;

where the memory stores instructions executable by the at least one processor, and the instructions are executed by the at least one processor to enable the at least one processor to perform any one of the method in the first aspect.

In a fourth aspect, a non-transitory computer readable storage medium storing computer instructions is provide in the present disclosure, where the computer instructions is configured to enable a computer to perform any one of the method in the first aspect.

Other effects of the above embodiments will be described below with reference to specific embodiments.

BRIEF DESCRIPTION OF THE DRAWINGS

The drawings are included to provide a better understanding of the present solution and are not to be considered limiting of the present disclosure.

DETAILED DESCRIPTION

The following description of the exemplary embodiments of the present disclosure, taken in conjunction with the accompanying drawings, includes various details of the embodiments of the application to assist in understanding, which are to be considered exemplary only. Accordingly, those of ordinary skill in the art will recognize that various changes and modifications of the embodiments described herein may be made without departing from the scope and spirit of the present disclosure. Also, descriptions of well-known functions and constructions are omitted in the following description for clarity and conciseness.

A method of processing a cover page image of multimedia information is provided in the present disclosure, which is applied to a client.

Figure 1:
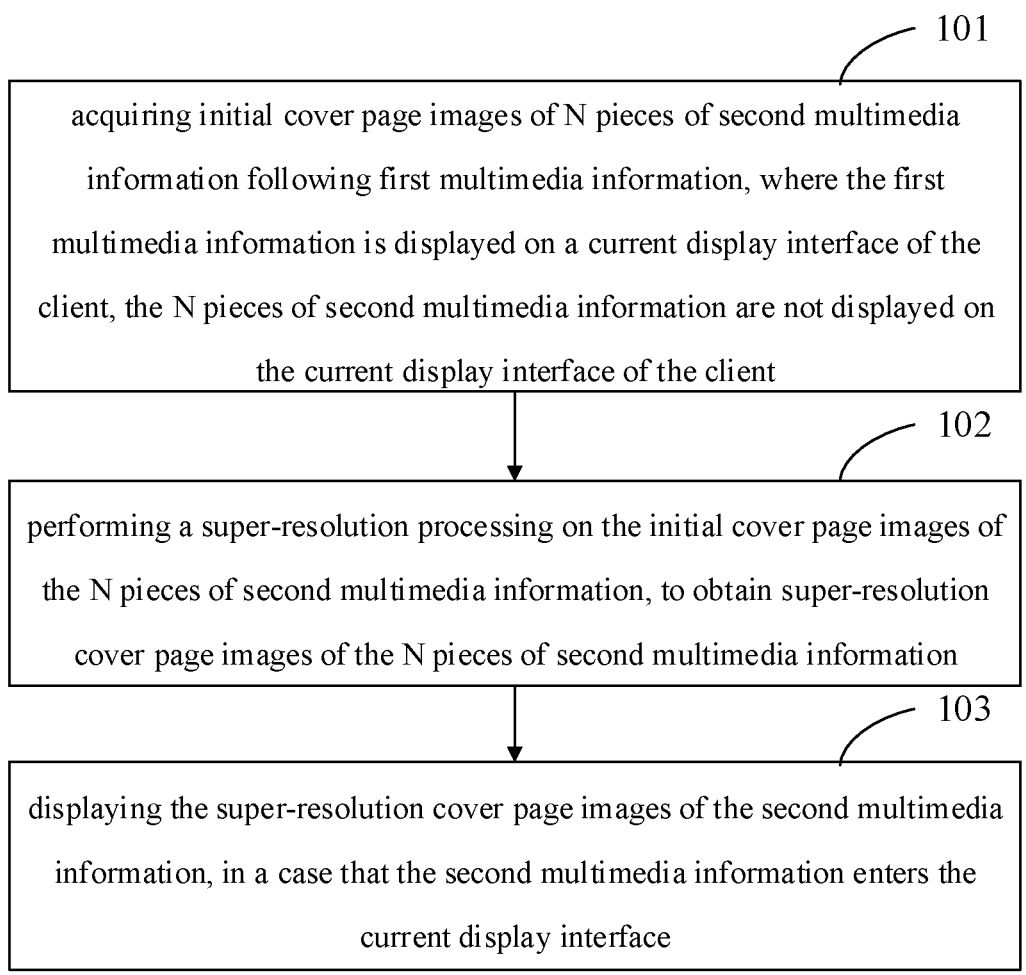
FIG. 1 is a flowchart illustrating a method for processing a cover page image of multimedia information according to an embodiment of the present disclosure.

As shown in FIG. 1, the method of processing a cover page image of multimedia information includes:

Step 101: acquiring initial cover page images of N pieces of second multimedia information following first multimedia information, where the first multimedia information is displayed on a current display interface of the client, the N pieces of second multimedia information are not displayed on the current display interface of the client, and N is an integer greater than or equal to 1.

The "multimedia information" in the present disclosure may refer to multimedia information in an information stream (e.g., Feed stream), such as video, news, promotion information, live broadcast, and so on. The client can acquire a plurality of pieces of multimedia information from the server in advance, the plurality of pieces of multimedia information form an information stream according to a preset arrangement sequence, and a user can browse the multimedia information in the information stream through the client according to the preset arrangement sequence. In practice, the user can browse or refresh the multimedia information in the information stream by a sliding operation.

When a user initially views multimedia information in an information stream, a client generally displays preview information of each multimedia information in the information stream, for example, a title and a cover page image of the multimedia information. In order to improve the preview effect of the multimedia information, the super-resolution processing may be performed on the cover page image of the multimedia information.

In this step, the client may obtain in advance an initial cover page image of N pieces of second multimedia information following the currently displayed first multimedia information.

The N pieces of second multimedia information may be N pieces of second multimedia information adjacent to the first multimedia information, or N pieces of second multimedia information separated from the first multimedia information by at least one piece of multimedia information, and may be flexibly selected according to the super-resolution processing capability and speed of the client, or according to the operation condition of the user.

In the step, by acquiring the initial cover page image of the multimedia information in advance, the super-resolution processing may be performed on the initial cover page image of the multimedia information in advance when the multimedia information does not enter the display interface of the client.

In the related art, the client requests the server for the cover page image of the multimedia information only when new multimedia information is refreshed, and then the server performs super-resolution processing on the initial cover page image of the multimedia information. When the server returns the super-resolution cover page image (called the super-resolution cover page image for short), the client refreshes the initial cover page image of the multimedia information into the super-resolution cover page image. Due to the fact that super-resolution processing is time-consuming and a certain time delay exists between the client and the server, the client cannot display the super-resolution cover page image of the multimedia information in time, especially when the user previews the multimedia information quickly, there is not enough time to display the super-resolution cover page image of the multimedia information, which results in a poor previewing effect of the multimedia information.

According to the present disclosure, when the multimedia information does not enter the display interface of the client, the client can perform a super-resolution processing on the initial cover page image of the multimedia information in advance by acquiring the initial cover page image of the multimedia information in advance.

Step 102: performing a super-resolution processing on the initial cover page images of the N pieces of second multimedia information, to obtain super-resolution cover page images of the N pieces of second multimedia information.

In this step, the client may perform the super-resolution processing on the initial cover page images of the N pieces of second multimedia information in advance, thereby obtaining super-resolution cover page images of the N pieces of second multimedia information.

When N is greater than 1, the client may sequentially perform super-resolution processing on the initial cover page images of the N pieces of second multimedia information according to a preset arrangement order.

According to the present disclosure, a related image super-resolution processing method may be adopted to perform super-resolution processing on the initial cover page images of the N pieces of second multimedia information. Specifically, an image super-resolution processing model may be set at the client, and the initial cover page images of the N pieces of second multimedia information may be input to the image super-resolution processing model to perform the super-resolution processing on the initial cover page images of the N pieces of second multimedia information.

In the present disclosure, the image super-resolution processing model may be trained by applying a deep learning technology. The super-resolution processing of the initial cover page image of the multimedia information by the client may be as follows: firstly, acquiring image parameters of an initial cover page image, taking the initial cover page image and the image parameters as input parameters, and inputting the input parameters into an image super-resolution processing model; secondly, in the image super-resolution processing model, operations such as deconvolution, interpolation and amplification are performed on pixels of the initial cover page image through a ResNet (Residual Network), to extract low-resolution image feature blocks in the initial cover page image; then, reconstructing the extracted low-resolution image feature blocks through a back projection filter according to the sparse representation mapping relation, to obtain the super-resolution cover page image.

The image parameters may include the width and height of the picture, the format of the picture, and the like.

Furthermore, according to the RGB arrangement rule of respective pixels in the initial cover page image, the pixels of the initial cover page image may be subjected to operations such as deconvolution, interpolation and amplification through ResNet.

In the present disclosure, the client can store the super-resolution cover page image obtained by the super-resolution processing in a preset database.

Step 103: displaying the super-resolution cover page images of the second multimedia information, in a case that the second multimedia information enters the current display interface.

In this step, in a case that any second multimedia information of the N pieces of second multimedia information enters the current display interface, the client may display the super-resolution cover page image of the second multimedia information.

In the present disclosure, before the second multimedia information enters the current display interface, the initial cover page image of the second multimedia information may be replaced by the super-resolution cover page image of the second multimedia information in advance; or the initial cover page image of the second multimedia message may be replaced with the super-resolution cover page image of the second multimedia message immediately when the second multimedia message enters the current display interface, which is not limited in the present disclosure.

According to the present disclosure, when the multimedia information does not enter the display interface of the client, the initial cover page image of the multimedia information is acquired by the client in advance, and a super-resolution processing is performed on the initial cover page image of the multimedia information in advance by the client, so that the super-resolution cover page image of the multimedia information may be displayed when the multimedia information enters the display interface of the client. According to the above method, the user may browse the super-resolution cover page image in time when previewing the multimedia information, and the previewing effect of the multimedia information may be improved.

Optionally, the acquiring the initial cover page images of the N pieces of second multimedia information following the first multimedia information includes:

acquiring the initial cover page images of the N pieces of second multimedia information following the first multimedia information, according to a quantity of multimedia information capable of being displayed by a single display interface of the client, where N is greater than or equal to the quantity of multimedia information.

In this embodiment, considering that a user can simultaneously display a plurality of pieces of multimedia information on a display interface of a client when browsing an information stream, at this time, the cover page images of the plurality of multimedia information may be simultaneously seen by the user, in order to ensure that all the cover page images of the multimedia information on a single display interface may be simultaneously displayed in a form of a super-resolution cover page image so as to further improve a preview effect of the multimedia information, the client may obtain at a single time the initial cover page images of the multimedia information that can occupy the entire display interface of the client. In addition, the client acquires the initial cover page images of a plurality of pieces of multimedia information at a single time, which can improve the super-resolution processing efficiency of the client compared with the case where an initial cover page image of a single piece of multimedia information is acquired at a single time.

In this embodiment, the initial cover page images of the N pieces of second multimedia information acquired by the client may be added to the super-resolution processing queue, and wait for the client to perform the super-resolution processing on the initial cover page images.

Optionally, the performing the super-resolution processing on the initial cover page images of the N pieces of second multimedia information to obtain the super-resolution cover page images of the N pieces of second multimedia information includes:

dividing the initial cover page images of the N pieces of second multimedia information into M processing groups, according to image parameters of the initial cover page images of the N pieces of second multimedia information, where each processing group includes at least one initial cover page image of the second multimedia information, and M is an integer greater than or equal to 1;

inputting the M processing groups into M image super-resolution processing models respectively to perform the super-resolution processing on the M processing groups, to obtain the super-resolution cover page images of the N pieces of second multimedia information.

According to the embodiment above, on one hand, by dividing the initial cover page images of the plurality of multimedia information into a plurality of processing groups, a parallel processing may be realized, so that the image processing speed may be increased, and the image processing efficiency may be improved; on the other hand, a plurality of image super-resolution processing models suitable for different image parameters may be set in the client, so that the initial cover page image of the multimedia information may be input into the appropriate image super-resolution processing model according to the image parameters, and the image processing efficiency and effect may be further improved.

In this embodiment, the image parameter may include a specification of the picture and a pixel arrangement rule (for example, an RGB arrangement rule of pixels) of the picture. The client can input the image parameters of the initial cover page image of the multimedia information into the deep learning model, and the initial cover page image of the multimedia information is grouped according to the training result.

Optionally, the displaying the super-resolution cover page images of the second multimedia information in the case that the second multimedia information enters the current display interface includes:

displaying the super-resolution cover page images of the second multimedia information, in a case that the second multimedia information enters the current display interface and a moving speed of the second multimedia information on the current display interface is less than or equal to a preset speed.

When a user browses the information stream through the client, the user can refresh the multimedia information by a sliding operation, and the multimedia information in the information stream can also move on a display interface of the client along with the sliding operation. Considering that the multimedia information may flash on the display interface of the client when the user slides rapidly, the user does not need to browse the multimedia information actually. In this case, whether the cover page image of the multimedia information is the super-resolution cover page image does not affect the preview experience of the user, and therefore, in this case, when the moving speed of the second multimedia information on the current display interface is greater than the preset speed, the super-resolution cover page image of the second multimedia information does not need to be displayed.

Correspondingly, when the moving speed of the second multimedia information on the current display interface is less than or equal to the preset speed, the time for the second multimedia information to stay on the current display interface is enough for the user to browse the second multimedia information, and in this case, in order to improve the preview effect of the multimedia information, a super-resolution cover page image of the second multimedia information needs to be displayed.

In the embodiment, whether the super-resolution cover page image of the multimedia information is displayed or not is determined according to the moving speed of the multimedia information on the current display interface, the super-resolution cover page image of the multimedia information is displayed when the super-resolution cover page image needs to be displayed, and the super-resolution cover page image of the multimedia information is not displayed when the super-resolution cover page image does not need to be displayed, so that the resource consumption required by the display of the super-resolution cover page image may be effectively reduced.

Optionally, the displaying the super-resolution cover page images of the second multimedia information in the case that the second multimedia information enters the current display interface includes:

replacing the initial cover page images of the second multimedia information with the super-resolution cover page images of the second multimedia information, in the case that the second multimedia information enters the current display interface; and displaying the super-resolution cover page images of the second multimedia information.

As described above, the initial cover page images of the second multimedia information may be replaced by the super-resolution cover page images of the second multimedia information in advance before the second multimedia information enters the current display interface; or the initial cover page images of the second multimedia message may be replaced by the super-resolution cover page images of the second multimedia message immediately when the second multimedia message enters the current display interface.

In this embodiment, considering that the resource occupied by the super-resolution cover page image is relatively large, and the time required for loading is relatively long, therefore, in order to reduce the resource consumption of the multimedia information and reduce the loading time of the multimedia information, the initial cover page image of the multimedia information may be replaced by the super-resolution cover page image immediately when the multimedia information enters the current display interface. Therefore, it is able to reduce the resource consumption of the multimedia information and reduce the loading time of the multimedia information.

In this embodiment, after obtaining the super-resolution cover page image of the multimedia information, the client may establish a mapping relationship between the super-resolution cover page image of the multimedia information and the initial cover page image thereof, and replace the super-resolution cover page image of the multimedia information with the corresponding initial cover page image according to the mapping relationship.

Optionally, the method further includes:

replacing the super-cover page images of the second multimedia information with the initial cover page images of the second multimedia information, in a case that the second multimedia information exits the current display interface of the client.

In this embodiment, in consideration of the relatively large resource occupied by the super-partition cover page image, in order to reduce the resource consumption of the multimedia information, the super-partition cover page image of the multimedia information may be replaced with the initial cover page image thereof when the multimedia information exits the current display interface. Therefore, it is able to reduce the resource consumption of the multimedia information.

It should be noted that, in the present disclosure, various optional embodiments of the method for processing a cover page image of multimedia information may be implemented in combination with each other or separately, and the present disclosure is not limited thereto.

According to the embodiments of the present disclosure, when the multimedia information does not enter the display interface of the client, the initial cover page image of the multimedia information is acquired by the client in advance, and a super-resolution processing is performed on the initial cover page image of the multimedia information in advance by the client, so that the super-resolution cover page image of the multimedia information may be displayed when the multimedia information enters the display interface of the client. According to the above method, the user may browse the super-resolution cover page image in time when previewing the multimedia information, and the previewing effect of the multimedia information may be improved.

Figure 2:
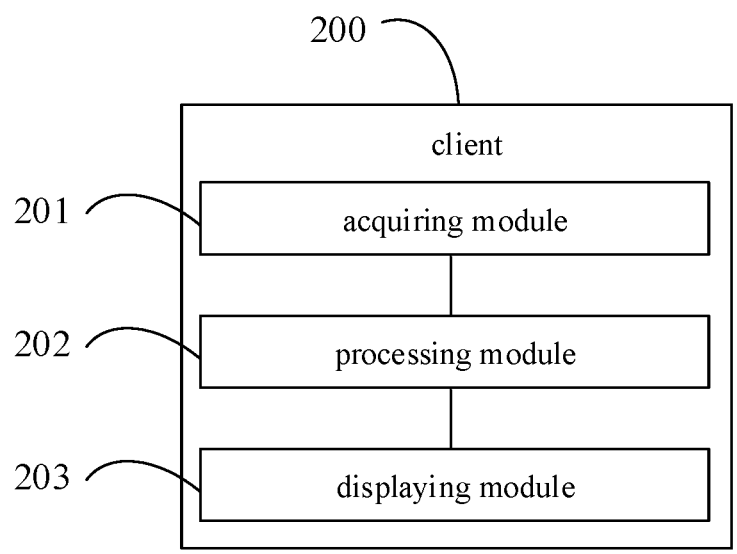
FIG. 2 is a schematic view of a client according to an embodiment of the present disclosure.

As shown in FIG. 2, a client is further provided in the present disclosure, the client 200 includes:

an acquiring module 201, configured to acquire initial cover page images of N pieces of second multimedia information following first multimedia information, where the first multimedia information is displayed on a current display interface of the client, the N pieces of second multimedia information are not displayed on the current display interface of the client, and N is an integer greater than or equal to 1;

a processing module 202, configured to perform a super-resolution processing on the initial cover page images of the N pieces of second multimedia information, to obtain super-resolution cover page images of the N pieces of second multimedia information; and a displaying module 203, configured to display the super-resolution cover page images of the second multimedia information in a case that the second multimedia information enters the current display interface.

Optionally, the acquiring module 201 is further configured to:

acquire the initial cover page images of the N pieces of second multimedia information following the first multimedia information, according to a quantity of multimedia information capable of being displayed by a single display interface of the client, where N is greater than or equal to the quantity of multimedia information.

Optionally, the processing module 202 includes:

a grouping submodule, configured to divide the initial cover page images of the N pieces of second multimedia information into M processing groups according to image parameters of the initial cover page images of the N pieces of second multimedia information, where each processing group includes at least one initial cover page image of the second multimedia information, and M is an integer greater than or equal to 1;

a processing submodule, configured to input the M processing groups into M image super-resolution processing models respectively to perform the super-resolution processing on the M processing groups, to obtain the super-resolution cover page images of the N pieces of second multimedia information.

Optionally, the displaying module 203 is further configured to:

display the super-resolution cover page images of the second multimedia information, in a case that the second multimedia information enters the current display interface and a moving speed of the second multimedia information on the current display interface is less than or equal to a preset speed.

Optionally, the displaying module 203 includes:

a replacing sub-module, configured to replace the initial cover page images of the second multimedia information with the super-resolution cover page images of the second multimedia information in the case that the second multimedia information enters the current display interface; and a displaying sub-module, configured to display the super-resolution cover page images of the second multimedia information.

Optionally, the client further includes:

a replacing module, configured to replace the super-cover page images of the second multimedia information with the initial cover page images of the second multimedia information in a case that the second multimedia information exits the current display interface of the client.

The client 200 provided by the present disclosure can implement each process implemented by the client in the above-mentioned method for processing a cover page image of multimedia information, and can achieve the same beneficial effects, and for avoiding repetition, the description is omitted here.

According to an embodiment of the present disclosure, an electronic device and a readable storage medium are further provided.

Figure 3:
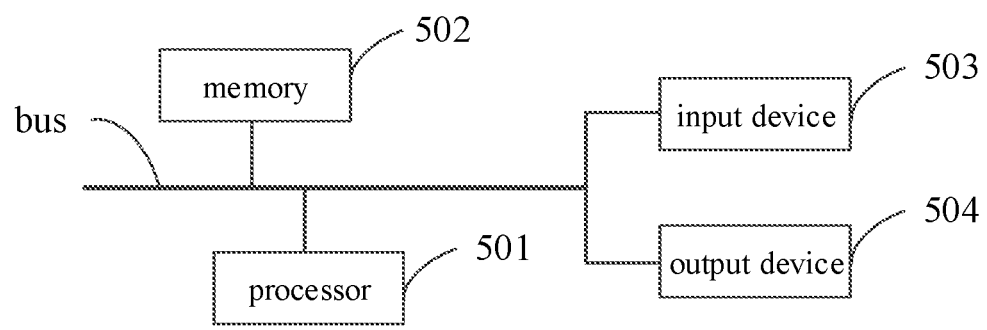
FIG. 3 is a block diagram of an electronic device for performing a method of processing a cover page image of multimedia information according to an embodiment of the present disclosure.

FIG. 3 is a block diagram of an electronic device according to an embodiment of the present disclosure. Electronic devices are intended to represent various forms of digital computers, such as laptops, desktops, workstations, personal digital assistants, servers, blade servers, mainframes, and other appropriate computers. Electronic devices may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementations of the applications described and/or claimed herein.

As shown in FIG. 3, the electronic apparatus includes: one or more processors 501, memory 502, and interfaces for connecting the various components, including high-speed interfaces and low-speed interfaces. The various components are interconnected using different buses and may be mounted on a common motherboard or in other manners as desired. The processor may process instructions for execution within the electronic device, including instructions stored in or on the memory to display graphical information of a GUI on an external input/output apparatus (such as a display device coupled to the interface). In other embodiments, multiple processors and/or multiple buses may be used, along with multiple memories and multiple memories, if desired. Also, multiple electronic devices may be connected, with each device providing some of the necessary operations (e.g., as an array of servers, a group of blade servers, or a multi-processor system). FIG. 3 illustrates an example of a processor 501.

Memory 502 is a non-transitory computer readable storage medium as provided herein. The memory stores instructions executable by the at least one processor to cause the at least one processor to perform the method for processing cover art of multimedia information provided by the present disclosure. The non-transitory computer-readable storage medium of the present disclosure stores computer instructions for causing a computer to execute the cover sheet processing method of multimedia information provided by the present disclosure.

Memory 502, which is a non-transitory computer-readable storage medium, may be used to store non-transitory software programs, non-transitory computer-executable programs, and modules, such as program instructions/modules (e.g., acquiring module 201, processing module 202, and displaying module 203 shown in FIG. 2) corresponding to the cover art processing method for multimedia information in the embodiments of the present disclosure. The processor 501 executes various functional applications of the client and data processing, i.e., a cover art processing method of multimedia information in the above method embodiments, by running non-transitory software programs, instructions, and modules stored in the memory 502.

The memory 502 may include a storage program area and a storage data area, wherein the storage program area may store an operating system, an application program required for at least one function; the storage data area may store data created according to use of an electronic device of a cover art processing method of multimedia information, and the like. Further, the memory 502 may include high speed random access memory, and may also include non-transitory memory, such as at least one magnetic disk storage device, flash memory device, or other non-transitory solid state storage device. In some embodiments, memory 502 may optionally include memory remotely located from processor 501, which may be connected to the electronic device of the cover art processing method of multimedia information via a network. Examples of such networks include, but are not limited to, the internet, intranets, local area networks, mobile communication networks, and combinations thereof.

The electronic device for performing the method of processing a cover page image of multimedia information may further include: an input device 503 and an output device 504. The processor 501, the memory 502, the input device 503 and the output device 504 may be connected by a bus or other means, and are exemplified by a bus connection in FIG. 3.

The input device 503 may receive input numeric or character information and generate key signal input related to user settings and function control of the electronic apparatus of the cover art processing method of multimedia information, such as an input device of a touch screen, a keypad, a mouse, a track pad, a touch pad, a pointing stick, one or more mouse buttons, a track ball, a joystick, or the like. The output devices 504 may include a display device, auxiliary lighting devices (e.g., LEDs), and tactile feedback devices (e.g., vibrating motors), among others. The display device may include, but is not limited to, a Liquid Crystal Display (LCD), a Light Emitting Diode (LED) display, and a plasma display. In some implementations, the display device may be a touch screen.

Various implementations of the systems and techniques described here may be realized in digital electronic circuitry, integrated circuitry, application specific ASICs (application specific integrated circuits), computer hardware, firmware, software, and/or combinations thereof. These various embodiments may include: implemented in one or more computer programs that are executable and/or interpretable on a programmable system including at least one programmable processor, which may be special or general purpose, receiving data and instructions from, and transmitting data and instructions to, a storage system, at least one input device, and at least one output device.

These computer programs (also known as programs, software applications, or code) include machine instructions for a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having: a display device (e.g., a CRT (cathode ray tube) or LCD (liquid crystal display) monitor) for displaying information to a user; and a keyboard and a pointing device (e.g., a mouse or a trackball) by which a user may provide input to the computer. Other kinds of devices may also be used to provide for interaction with a user; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a user computer having a graphical user interface or a web browser through which a user can interact with an implementation of the systems and techniques described here), or any combination of such back-end, middleware, or front-end components. The components of the system may be interconnected by any form or medium of digital data communication (e.g., a communication network). Examples of communication networks include: local Area Networks (LANs), Wide Area Networks (WANs), and the Internet.

The computer system may include clients and servers. A client and server are generally remote from each other and typically interact through a communication network. The relationship of client and server arises by virtue of computer programs running on the respective computers and having a client-server relationship to each other.

According to the present disclosure, when the multimedia information does not enter the display interface of the client, the initial cover page image of the multimedia information is acquired by the client in advance, and a super-resolution processing is performed on the initial cover page image of the multimedia information in advance by the client, so that the super-resolution cover page image of the multimedia information may be displayed when the multimedia information enters the display interface of the client. According to the above method, the user may browse the super-resolution cover page image in time when previewing the multimedia information, and the previewing effect of the multimedia information may be improved.

It should be understood that various forms of the flows shown above, reordering, adding or deleting steps, may be used. For example, the steps described in the present disclosure may be executed in parallel, sequentially, or in different orders, and are not limited herein as long as the desired results of the technical solutions disclosed in the present disclosure may be achieved.

It will be understood by those skilled in the art that all or part of the processes of the methods of the embodiments described above may be implemented by controlling related hardware through a computer program, where the computer program may be stored in a computer-readable storage medium, and when executed, the computer program may include the processes of the embodiments of the methods described above. The storage medium may be a magnetic disk, an optical disk, a Read-Only Memory (ROM), a Random Access Memory (RAM), or the like.

It is to be understood that some embodiments of the present disclosure described herein may be implemented in hardware, software, firmware, middleware, microcode, or a combination thereof. For a hardware implementation, the modules, units, sub-modules, sub-units, etc. may be implemented in one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose processors, controllers, micro-controllers, microprocessors, other electronic units designed to perform the functions described herein, or a combination thereof.

For a software implementation, the techniques described in some embodiments of the present disclosure may be implemented with modules (e.g., procedures, functions, and so on) that perform the functions described in some embodiments of the present disclosure. The software codes may be stored in a memory and executed by a processor. The memory may be implemented within the processor or external to the processor.

The above embodiments are not intended to limit the scope of the present disclosure. It should be understood by those skilled in the art that various modifications, combinations, sub-combinations and substitutions may be made, depending on design requirements and other factors. Any modification, equivalent replacement, and improvement made within the principle of the present disclosure shall be included in the scope of the present disclosure.

What is claimed is:

1. A method of processing a cover page image of multimedia information, applied to a client and comprising:
    acquiring, in the case that first multimedia information is displayed on a current display interface of the client and N pieces of second multimedia information are not displayed on the current display interface of the client, initial cover page images of the N pieces of second multimedia information following the first multimedia information, wherein N is an integer greater than or equal to 1;
    performing a super-resolution processing on the initial cover page images of the N pieces of second multimedia information, to obtain super-resolution cover page images of the N pieces of second multimedia information; and
    displaying the super-resolution cover page images of the second multimedia information, in a case that the second multimedia information enters the current display interface;
    wherein the acquiring the initial cover page images of the N pieces of second multimedia information following the first multimedia information comprises:
    acquiring the initial cover page images of the N pieces of second multimedia information following the first multimedia information, according to a quantity of multimedia information capable of being displayed by a single display interface of the client, wherein N is greater than or equal to the quantity of multimedia information.

2. The method according to claim 1, wherein the performing the super-resolution processing on the initial cover page images of the N pieces of second multimedia information to obtain the super-resolution cover page images of the N pieces of second multimedia information comprises:

dividing the initial cover page images of the N pieces of second multimedia information into M processing groups, according to image parameters of the initial cover page images of the N pieces of second multimedia information, wherein each processing group comprises at least one initial cover page image of the second multimedia information, and M is an integer greater than or equal to 1;

inputting the M processing groups into M image super-resolution processing models respectively to perform the super-resolution processing on the M processing groups, to obtain the super-resolution cover page images of the N pieces of second multimedia information.

3. The method according to claim 1, wherein the displaying the super-resolution cover page images of the second multimedia information in the case that the second multimedia information enters the current display interface comprises:

displaying the super-resolution cover page images of the second multimedia information, in a case that the second multimedia information enters the current display interface and a moving speed of the second multimedia information on the current display interface is less than or equal to a preset speed.

4. The method according to claim 1, wherein the displaying the super-resolution cover page images of the second multimedia information in the case that the second multimedia information enters the current display interface comprises:

replacing the initial cover page images of the second multimedia information with the super-resolution cover page images of the second multimedia information, in the case that the second multimedia information enters the current display interface; and displaying the super-resolution cover page images of the second multimedia information.

5. The method according to claim 1, further comprising:

replacing the super-resolution cover page images of the second multimedia information with the initial cover page images of the second multimedia information, in a case that the second multimedia information exits the current display interface of the client.

6. A client, comprising:

at least one processor; and a memory communicatively coupled to the at least one processor;

wherein the memory stores instructions executable by the at least one processor, and the instructions are executed by the at least one processor to enable the at least one processor to:

acquire, in the case that first multimedia information is displayed on a current display interface of the client and N pieces of second multimedia information are not displayed on the current display interface of the client, initial cover page images of the N pieces of second multimedia information following the first multimedia information, wherein N is an integer greater than or equal to 1;

perform a super-resolution processing on the initial cover page images of the N pieces of second multimedia information, to obtain super-resolution cover page images of the N pieces of second multimedia information; and display the super-resolution cover page images of the second multimedia information in a case that the second multimedia information enters the current display interface;

wherein the instructions are executed by the at least one processor to enable the at least one processor to acquire the initial cover page images of the N pieces of second multimedia information following the first multimedia information, according to a quantity of multimedia information capable of being displayed by a single display interface of the client, wherein N is greater than or equal to the quantity of multimedia information.

7. The client according to claim 6, wherein the instructions are executed by the at least one processor to enable the at least one processor to divide the initial cover page images of the N pieces of second multimedia information into M processing groups according to image parameters of the initial cover page images of the N pieces of second multimedia information, wherein each processing group comprises at least one initial cover page image of the second multimedia information, and M is an integer greater than or equal to 1;

input the M processing groups into M image super-resolution processing models respectively to perform the super-resolution processing on the M processing groups, to obtain the super-resolution cover page images of the N pieces of second multimedia information.

8. The client according to claim 6, wherein the instructions are executed by the at least one processor to enable the at least one processor to display the super-resolution cover page images of the second multimedia information, in a case that the second multimedia information enters the current display interface and a moving speed of the second multimedia information on the current display interface is less than or equal to a preset speed.

9. The client according to claim 6, wherein the instructions are executed by the at least one processor to enable the at least one processor to replace the initial cover page images of the second multimedia information with the super-resolution cover page images of the second multimedia information in the case that the second multimedia information enters the current display interface; and display he super-resolution cover page images of the second multimedia information.

10. The client according to claim 6, wherein the instructions are executed by the at least one processor to enable the at least one processor to replace the super-resolution cover page images of the second multimedia information with the initial cover page images of the second multimedia information in a case that the second multimedia information exits the current display interface of the client.

* * * * *